Patented Aug. 6, 1940

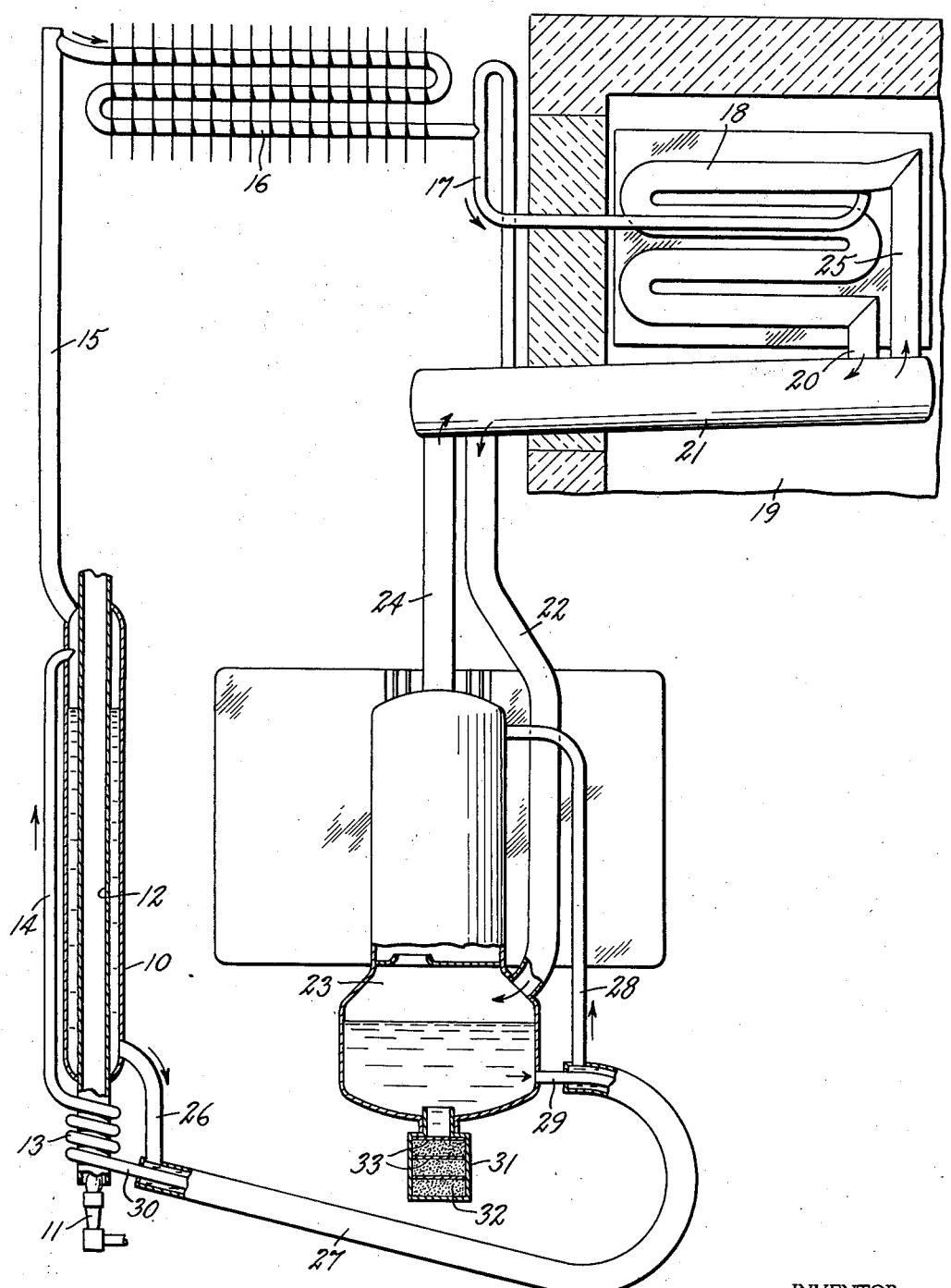

2,210,611

UNITED STATES PATENT OFFICE 2,210,611

REFRIGERATION

Nils Erik Widell, Stockholm, Sweden, assignor, by mesne assignments, to Servel, Inc., New York, N. Y., a corporation of Delaware Application January 18, 1939, Serial No. 251,495 In Germany February 2, 1938

7 Claims. (Cl. 62—119.5)

My invention relates to refrigeration, more particularly to hermetically sealed refrigeration systems, and still more particularly to absorption type refrigeration systems containing auxiliary pressure equalizing fluid.

It is an object of the present invention to inhibit corrosion of the metal parts of a refrigeration system directly or indirectly due to the presence of the fluids therein by the novel method and means herein described in connection with the accompanying drawing forming a part of this specification and of which the single figure shows more or less diagrammatically a refrigeration system embodying the invention.

Referring to the drawing, a generator 10 is heated by a burner 11 arranged so that the flame projects upward into a flue 12 which extends upward through the generator. Around the lower end of flue 12 is a small pipe coil 13. The upper end of coil 13 is connected to the lower end of a conduit 14. The upper end of conduit 14 is connected to the upper part of generator 10 and comprises a thermosyphon or vapor liquid lift conduit.

The upper end of generator 10 is connected by a conduit 15 to the upper end of an air cooled condenser 16. The lower end of condenser 16 is connected by a conduit 17 to the upper end of an evaporator 18. The evaporator is located in a refrigerator storage compartment 19.

The upper end of evaporator 18 is connected by a conduit 20, gas heat exchanger 21, and a conduit 22 to the lower part of an air cooled absorber 23. The upper part of absorber 23 is connected by a conduit 24, gas heat exchanger 21, and a conduit 25 to the lower end of evaporator coil 18.

The lower part of generator 10 is connected by a conduit 26, a liquid heat exchanger 27, and a conduit 28 to the upper part of absorber 23. The lower part of absorber 23 is connected by a conduit 29, liquid heat exchanger 27, and a conduit 30 to the lower end of coil 13.

The above described system is evacuated and charged with refrigerant fluid, such as ammonia, an absorption liquid, such as water, and an inert auxiliary pressure equalizing fluid, such as hydrogen. Heat supplied to generator 12 from burner 11 causes expulsion of ammonia vapor from solution in the generator. The vapor flows from the generator through conduit 15 to condenser 16. Ammonia vapor condenses to liquid in condenser 16. The liquid flows from the condenser through conduit 17 into evaporator 18. Liquid ammonia evaporates and diffuses into hydrogen in evaporator 18, producing a refrigerating effect for cooling air in the refrigerator compartment 19.

Rich gas flows from evaporator 18 through conduit 20, gas heat exchanger 21, and conduit 22 into absorber 23. Absorption liquid flows from generator 10 through conduit 26, liquid heat exchanger 27, and conduit 28 into the upper part of absorber 23. Absorption liquid flows downward in the absorber, absorbing ammonia vapor out of the gas. Weak gas flows from the absorber through conduit 24, gas heat exchanger 21, and conduit 25 back to evaporator 18. Enriched absorption liquid flows from the lower part of absorber 23 through conduit 29, liquid heat exchanger 27, coil 13, and conduit 14 into generator 10.

The described circulation in the evaporator-absorber gas circuit is caused by difference in weights of the columns of rich and weak gas. The described circulation in the generator-absorber liquid circuit takes place by gravity flow from the generator to the absorber and by thermosyphon or vapor lift action from the absorber to the generator upward in conduit 14.

The parts of the above described apparatus are of iron or steel. It is known to place a small quantity of corrosion inhibiting substance in the system at the time of charging. One class of substance which has been found suitable for the purpose of inhibiting corrosion is that containing chromium, as, for example, potassium or sodium chromate or bichromate. The corrosion inhibiting substance is most effective when carried in solution by the absorption liquid, because the purpose is to prevent corrosion in the generator-absorber circuit and the resultant deposition of magnetic iron oxide. It is known to use an initial charge containing sodium chromate equivalent to as much as 1.6% to 2.0% $CrO_3/H_2O$ in solution. This initial concentration decreases with time as the unit is operated. It is impractical to increase the initial chromate content of the solution to any great extent. High chromate content reduces the solubility of ammonia and thus interferes with the operation of the system. It is also necessary to avoid the possibility of precipitation of solid chromate at points which might block fluid circulation. It is therefore desirable to provide a reserve supply of chromate and cause it to enter the solution as needed.

The absorption solution originally charged into the system and containing, for instance, sodium chromate, is gradually changed chemically as the chromate is reduced. Reduction of the chromate leads to a formation of sodium hydroxide (NaOH) and a reduction of the hydrogen ion concentration of the solution. The change becomes greater as more chromate is used, since continuously more sodium hydroxide is formed. I utilize this chemical change to automatically introduce a new supply of chromate into the solution. The reserve supply of chromate is kept separate from the solution by a barrier which is removed by the chemical change, that is, by a product formed by the using up of chromate in the solution, the product itself being used up and rendered inactive upon removal of the barrier so that there may be provided a plurality of reserve quantities of chromate separated by a series of barriers, each in turn removed responsive to said control factor.

To the bottom of absorber 23 is connected a receptacle 31 divided into a plurality of compartments 32 by a series of thin aluminum partitions 33. The top aluminum partition is contacted on the upper surface by absorption solution in the bottom of absorber 23. Compartments 32 are filled with a solid corrosion protection substance such as ammonium chromate. The solution initially charged into the system contains, for instance, sodium chromate equivalent to 1.6% or 2.0% $CrO_3/H_2O$ in solution. The upper aluminum partition 33 is not attacked by ammonia in the presence of chromate. However, upon reduction of the chromate, sodium hydroxide is formed. The aluminum is corroded by sodium hydroxide with the formation of hydrogen and sodium aluminate. The reaction velocity between aluminum and sodium hydroxide solution increases rapidly with increasing concentration of the solution. An increase in the sodium hydroxide concentration from .1% to .5% increases the reaction speed twenty times. Thus it is possible to make the time intervening between the charging of the system and breakdown of the aluminum partition dependent on the progressive decrease of the chromate concentration.

As soon as the aluminum partition is broken by corrosion, the ammonium chromate contained in the upper compartment 33 comes in contact with the solution whereby sodium chromate is again formed in known manner. This process is repeated with respect to the successive aluminum partitions and their protected reserve supplies of chromate if and when called for by the above described chemical changes.

When ammonium chromate is released into the solution, it is changed into sodium chromate and the sodium hydroxide concentration is reduced. The thickness of the aluminum discs and the amount of ammonium chromate should be so balanced that the sodium hydroxide concentration becomes zero, that is, so that all the ammonium chromate is changed into sodium chromate. The aluminum disc in front of the next section in the reservoir will therefore not be attacked until the chromate has again commenced to diminish with formation of sodium hydroxide. Any number of reserve sections can therefore be employed, without increasing the concentration of sodium hydroxide in the solution.

In place of aluminum there can be used any substances which for all practical purposes are not influenced by the fluids normally contained in the system but which are attacked in the chemical process taking place in the system. For instance, zinc and other metals of which the ions are amphoteric may be used. Also, the barriers may take other forms, for instance, the reserve chromate may be embedded or mixed in a silicate or the like so that the sodium hydroxide solution can contact the reserve chromate only after having reached a predetermined strength.

Various other changes and modifications may be made within the scope of the invention which is not limited except as indicated in the following claims.

What is claimed is:

1. An hermetically sealed refrigeration system containing liquid and a corrosion preventing substance dissolved in the liquid, a reserve quantity of corrosion preventing substance, and a barrier between the liquid and reserve substance, said barrier being chemically removed only upon reduction of said substance in solution to permit said reserve quantity to be dissolved in the liquid.

2. A refrigeration system as set forth in claim 1 in which there are a plurality of reserve quantities of corrosion preventing substance separated from the liquid and each other by a series of said barriers.

3. A refrigeration system as set forth in claim 1 in which said liquid is a water solution of ammonia and sodium chromate, said reserve substance is ammonium chromate, and said barrier is aluminum.

4. That improvement in inhibiting corrosion in a refrigeration system containing liquid which consists in providing corrosion preventing substance in solution in the liquid, maintaining a reserve supply of corrosion preventing substance out of contact with the liquid, and bringing said reserve substance into contact with the liquid for dissolution therein responsive to reduction of said substance in solution.

5. That improvement in inhibiting corrosion in a refrigeration system containing liquid which consists in providing a corrosion preventing substance in solution in the liquid, maintaining a reserve supply of corrosion preventing substance out of contact with the liquid, utilizing a product of reduction of said substance in solution to bring said reserve substance into contact with the liquid for dissolution therein, said product of reduction being substantially eliminated by reaction with said reserve substance upon dissolution thereof.

6. A process as set forth in claim 5 in which the liquid is a water solution of ammonia containing dissolved sodium chromate, the reserve substance is ammonium chromate which is kept out of contact with the liquid by aluminum, the aluminum being attacked by sodium hydroxide produced upon reduction of the chromate in solution, and the sodium hydroxide being substantially eliminated by reaction with the ammonium chromate when released to form sodium chromate.

7. A refrigeration system containing liquid and a corrosion preventing substance dissolved in the liquid, a reserve quantity of substance, and a barrier between the liquid and reserve substance, said barrier being chemically attacked only by a product of reduction of said substance in solution to permit said reserve substance to be dissolved in the liquid, said product of reduction and said reserve substance being reactive to reform said corrosion preventing substance in solution.

NILS ERIK WIDELL.